(12) United States Patent
Van Kessel

(10) Patent No.: US 10,604,637 B2
(45) Date of Patent: Mar. 31, 2020

(54) LASER MARKING ADDITIVE

(71) Applicant: INNOCABS B.V., Eijsden (NL)

(72) Inventor: I. T. I. P. Van Kessel, Eijsden (NL)

(73) Assignee: INNOCABS B.V., Eijsden (NL)

(*) Notice: Subject to any disclaimer, the term of this patent is extended or adjusted under 35 U.S.C. 154(b) by 0 days.

(21) Appl. No.: 16/324,318

(22) PCT Filed: Aug. 3, 2017

(86) PCT No.: PCT/EP2017/069639
§ 371 (c)(1),
(2) Date: Feb. 8, 2019

(87) PCT Pub. No.: WO2018/029068
PCT Pub. Date: Feb. 15, 2018

(65) Prior Publication Data
US 2019/0218363 A1 Jul. 18, 2019

(30) Foreign Application Priority Data
Aug. 11, 2016 (EP) .................................. 16183784

(51) Int. Cl.
| | | |
|---|---|---|
| C08K 3/22 | (2006.01) | |
| C08K 5/053 | (2006.01) | |
| C08K 13/02 | (2006.01) | |
| C08K 3/10 | (2018.01) | |
| C08K 5/09 | (2006.01) | |
| B41M 5/26 | (2006.01) | |
| C08F 210/02 | (2006.01) | |
| C08F 220/18 | (2006.01) | |
| C08J 3/22 | (2006.01) | |
| C08K 5/06 | (2006.01) | |
| C08L 23/08 | (2006.01) | |
| C08L 33/06 | (2006.01) | |

(52) U.S. Cl.
CPC .............. *C08K 3/22* (2013.01); *B41M 5/267* (2013.01); *C08F 210/02* (2013.01); *C08F 220/18* (2013.01); *C08J 3/226* (2013.01); *C08K 3/10* (2013.01); *C08K 5/053* (2013.01); *C08K 5/06* (2013.01); *C08K 5/09* (2013.01); *C08K 13/02* (2013.01); *C08L 23/0869* (2013.01); *C08L 33/062* (2013.01); *C08L 23/0846* (2013.01); *C08L 23/0853* (2013.01); *C08L 2205/03* (2013.01); *C08L 2310/00* (2013.01)

(58) Field of Classification Search
CPC . C08K 3/22; C08K 3/10; C08K 5/053; C08K 5/06; C08F 220/18
See application file for complete search history.

(56) References Cited

U.S. PATENT DOCUMENTS 7,169,471 B1    1/2007  Dreher et al.

FOREIGN PATENT DOCUMENTS

| CN | 105085944 A | 11/2015 |
|---|---|---|
| WO | 0078554 A1 | 12/2000 |
| WO | 2004050766 A1 | 6/2004 |
| WO | 2009003976 A1 | 1/2009 |
| WO | 2011050934 A2 | 5/2011 |
| WO | 2014060099 A2 | 4/2014 |

*Primary Examiner* — Lamson D Nguyen
(74) *Attorney, Agent, or Firm* — Hudak, Shunk & Farine Co. LPA

(57) ABSTRACT

A laser marking additive including a bismuth compound and a polyol. The laser marking additive can be directly added to a matrix polymer to prepare a laser markable composition, or the laser marking additive can be added to a polymer to prepare a masterbatch, which can be added to a matrix polymer. Preferred polyols are PEG, and polyols having at least 3 hydroxy groups.

20 Claims, No Drawings

LASER MARKING ADDITIVE

FIELD OF THE INVENTION

The invention is directed to a laser marking additive, a process for the production of the laser marking additive, a lasermarkable composition comprising the laser marking additive and to the lasermarking of an article comprising the lasermarkable composition.

BACKGROUND OF THE INVENTION

Laser marking additives are known and are described in the prior art.

Laser marking additives can be added to various matrix polymers to be able to leave a mark on an article made from the matrix polymer by after treating the article with laser light.

Laser marking additives preferably are employed in very small amounts and have no or a very light own color.

The use of laser marking additives based on antimony and bismuth are well known.

Such laser marking additives are described, for example in WO2004050766, WO2009003976, WO2011050934 and WO2014060099.

A disadvantage of laser marking additives based on bismuth is that they are not suitable in all types of plastics. In certain matrix polymers the bismuth compound shows severe discoloration when high processing temperatures, for example higher than 220° C., are used. $Bi_2O_3$ can, for example, not be used as an additive in polyimide, since during processing an exothermic reaction takes place resulting in a dark product.

WO2004050766 describes a laser light absorbing additive comprising particles that contain at least a first polymer with a first functional group and 0-95 wt. % of an absorber. The absorber can, for example, comprise bismuth. The particles are microspheres, containing a core and a shell. The microspheres described in WO2004050766 have proven to provide a better resolution and contrast by laser irradiation than the composition disclosed in other prior art. However, the contrast obtained with these microspheres, especially at (very) high marking speeds is still relatively low. Moreover, high contrast is mainly obtained while marking with high laser pulse energies. Marking should therefore preferably be performed in focus of the laser beam which limits the marking area per pulse and hence increases marking time.

WO2011050934 describes a laser marking additive composition comprising a bismuth containing compound and a functionalized polymer having 0.01 to 50 wt. % functional groups. The laser marking additive is added in small amounts (up to 2 wt. %) to a matrix polymer to obtain a lasermarkable composition. The disadvantage of this laser marking additive is that the functionalized polymer does not contribute to the color forming process and therefore reduces the marking performance with respect to especially marking speed. Also because of this, applying this laser marking additive in non or insufficient laser-markable polymers such as polyolefins, will result in very poor marking performance with respect to both marking contrast and speed. Moreover, upon processing above the generally low melting point (Tm<160° C.) of the functionalized polymer in certain matrix polymers, the laser marking additive will show discoloration due to migration of the bismuth compound to the matrix polymer.

WO2014060099 describes microspheres and their use as laser absorbing additives. The microspheres have a core/shell structure and the core comprises at least one bismuth compound. The disadvantage of the microspheres according to WO2014060099 is that at least two carriers are needed, one for the core and one for the shell, before the microsphere can be dispersed in the matrix polymer. Furthermore, two processing steps are required to obtain the laser marking additive which results in additional costs.

WO2000/78554 describes laser marking compositions. As marking pigment TiO2 is used, while as a fixing material a bismuth trioxide can be applied. The TiO2 and bismuth oxide are applied as a layer on a substrate, which is subsequently cured. The composition that is applied on the substrates comprises a propylene glycol as a solvent. Upon application on the substrate and curing of the composition, the solvent is evaporated. After curing the laser marking is performed.

CN105085944 describes a laser marking thermoplastic polyurethane special material which is prepared by crushing a metaloxide, dissolving it in hydrochloric acid, adding an alcohol under UV irradiation, heating and cooling while adding sodium chloride and a further material having a function as a surfactant and a polyurethane matrix resin.

SUMMARY OF THE INVENTION

The object of the present invention is to find a laser marking additive which enables high-contrast marking on exposure to laser light, contains only small amounts of heavy metals, using a sustainable production method preferably excluding the use of halogen containing substances and excluding the use of solvents. Use of the laser marking additive according to the invention improves the contrast and the resolution at low and high marking speeds, with less dependency on focal distance.

The object of the invention is achieved by a laser marking additive comprising a bismuth compound and an alcohol.

The laser marking additive according to the invention has the advantages that increased response to laser is obtained, generating deeper colored markings or markings can be made with higher laser speeds and/or less laser power or lower laser frequencies and having less dependency on focal distance; furthermore the laser marking additive can be either used as an additive to a matrix polymer or can be transformed into a masterbatch which can be added to the matrix polymer. Moreover, the use of an alcohol having a melt temperature of at least 40° C., preferably at least 80° C. gives a laser marking additive that is stable under ambient conditions, and can be processed with a resin without deterioration or coloring of the composition comprising the polyol.

DETAILED DESCRIPTION OF THE INVENTION

The invention relates to the laser marking additive, to the use of the laser marking additive, to masterbatches containing the laser marking additive and to polymer blends containing the masterbatch or the laser marking additive.

Bismuth Compound

The bismuth compound should be able to absorb laser light. Examples of suitable bismuth compounds are oxides, hydroxides, sulphides, sulphates and phosphates of bismuth. Examples of bismuth compounds are $BiONO_3$, $Bi_2O_2CO_3$, $BiOOH$, $Bi_2O_3$, $BiOC_3H_5O_7$, $Bi(C_7H_5O_2)_3$, $BiPO_4$, $Bi_2(SO_4)_3$ and Bi-citrate. Preferably $Bi_2O_3$ is used as bismuth compound, because $Bi_2O_3$ is halogen-free, has a light color and gives a high contrast at the highest marking speed compared to other bismuth compounds.

The amount of Bi-compound in the laser marking additive ranges between 0.01 wt % and 99.99. wt. %, preferably between 1 and 99 wt. % of the laser marking additive. Preferably the amount of Bismuth ranges between 25 and 75 wt. % in the laser marking additive.

Alcohol

The lasermarking additive comprises an alcohol. Preferably the alcohol is a polyol.

Preferably the alcohol is a solid at room temperature, more preferably having a melting temperature of at least 40° C., or preferably at least 80° C. More preferably the alcohol has a melting temperature (Tm) of at least 100° C., 150° C. or at least 200° C., 220 or 240° C. In a most preferred embodiment, the melting temperature of the alcohol is preferably between 0 and 50° C. above the processing temperature of the matrix polymer in the step of making a laser markable composition.

Without wanting to be bound by any theory, it is believed that the alcohol carbonizes during irradiation of the laser marking additive and improves the laser marking of a matrix material. A polyol is a compound comprising two or more hydroxyl (—OH) groups. Examples of alcohols are tetradecanol, hexadecanol, (also called cetyl and lauryl alcohol). Examples of polyols are butyl ethyl propanediol, hexanediol, methyl propanediol, neopentyl glycol, trimethylpentanediol, trimethylolpropane, glycerine, di-trimethylolpropane, pentaerythritol, di-pentaerythritol, difunctional propoxylated polyol, trifunctional ethoxylated polyol, tetrafunctional ethoxylated polyol, dimethylolpropionic acid, trimethyolpropane monoallyl ether, monoethylene glycol, diethyleneglycol and polyethylene glycol.

Preferably, the polyol is chosen from the group consisting of pentaerythritol, dipentaerythritol, 1,1,1-tris(hydroxymethyl) ethane (or 2-Hydroxymethyl-2-methyl-1,3-propanediol), 2,2,2',2',tetrakis(hydroxymethyl)-3,3'oxydipropan-1-ol, di(trimethylolpropane).

The amount of polyol in the laser marking additive ranges between 99.99 and 0.01 wt. %, relative to the total of the laser marking additive, preferably between 99 and 1 wt. %.

In the laser marking additive the weight ratio of the light-absorbing bismuth compound and the polyol preferably is between 1000:1 and 1:1000, more preferably between 10:1 and 1:10. To choose a suitable weight ratio the person skilled in the art will be guided by the desired amount of the additive composition in the matrix polymer.

In a preferred embodiment, the weight ratio between $Bi_2O_3$ and the alcohol having a melting temperature Tm of at least 40° C., preferably at least 80° C. is between 3:1 and 1.5:1.

In a preferred embodiment, the $Bi_2O_3$ and the alcohol are mixed as a physical blend of two individual components.

The laser marking additive, comprising a bismuth compound (preferably bismuth oxide) and an alcohol (preferably a polyol), can be added directly to a matrix polymer, or can be formed into a master batch. The masterbatch can be added to a matrix polymer. The combination of the matrix polymer with the laser marking additive is a laser markable composition.

Carrier Material

The laser marking additive may comprise a carrier material. The carrier material disperses and dilutes the additive composition and facilitates the dispersion of the additive composition in a matrix polymer.

The carrier material is a liquid or a polymeric material.

In principle any liquid can be applied that can disperse the Bi-compound. Preferably the boiling point of the liquid is higher than the extrusion temperature of the matrix polymer. Examples of liquids are oils, fatty acids, monomers like for example MMA, dispersants and the like.

According to an embodiment the carrier material is an oil, preferably a natural oil is applied. For example, the oil is linseed oil, olive oil, or a paraffinic oil.

According to an embodiment the carrier material is a fatty acid. A fatty acid is a carboxylic acid with a long aliphatic chain, which can be either saturated or unsaturated. The fatty acids preferably have 4-28 carbon atoms in the aliphatic chain. Examples of fatty acids are palmitoleic acid, oleic acid, α-linoleic acid, arachidonic acid, lauric acid, palmitic acid, stearic acid and the like.

According to a further embodiment the carrier material is a polymeric material. Preferably, the polymeric material is polyethylenemethylacrylate (EMA) or polyethylenevinylacetate (EVA).

In an embodiment the Bi-compound and the polyol are encapsulated in the carrier material in order to be dispersed as particles in the matrix polymer.

The invention also relates to a masterbatch comprising between 0.01 and 70 wt. % of the laser marking additive, wherein preferably the weight ratio between bismuth oxide and alcohol ranges between 3:1 and 0.5:1. The master batch can further contain between 30 and 99.99 wt. % of a liquid or polymer.

Example of the liquid can be for example a liquid colorant, wherein a masterbatch is obtained which is a colorant and which can be a laser marking additive at the same time.

Example of the polymer which can be present in the masterbatch can be any polymer, like a polyolefin, a polyester, a polycarbonate, an elastomeric material, a polystyrene, ABS and the like.

Mixing of the laser marking additive and a matrix polymer can be performed in different ways. A preferred way is to extrude the matrix polymer with the laser marking additive.

Both the bismuth compound and polyol can be added directly (and independently) to the extruder while also feeding the matrix polymer to the extruder, and together be extruded into an article.

The bismuth compound and polyol can also first be mixed together and as a mixture be added to a matrix polymer in (for example) an extruder.

Also the bismuth compound and polyol can be added to a carrier polymer in an extruder to make a masterbatch which can be blended in a next step with a matrix material to make a laser markable composition.

It is possible that the amount of light absorbing bismuth compound is as low as 500 ppm in the laser-markable composition to obtain good resolution, or even as low as 250 ppm. Especially in transparent carrier polymers, the amount of laser marking additive ranges preferably between 0.02 and 0.2 wt. %, or between 0.03 and 0.1 wt. %.

Preferably, the amount of light absorbing bismuth compound in an opaque laser-markable composition is between 0.05 to 2 wt. %, based on the total weight of the composition. This gives good laser-marking performance while retaining the mechanical properties of the lasermarking composition.

Composition

The invention is further directed to a laser markable composition comprising 95-99.9 wt. % of a matrix polymer and 0.1-5 wt. % of the laser marking additive, based on the total weight of the laser markable composition. The laser markable composition can be prepared by mixing the laser marking composition with the matrix polymer, for example, in an extruder.

The matrix polymer can be any type of polymer such as plastics, binders and resins. Suitable matrix polymers are thermoplastic and thermosetting plastics such as polyethylene (PE), polypropylene (PP), polyester, polyether, polyphenylene ether, polyacrylate, polyurethane (PU), polyoxymethylene (POM), polymethacrylate, polymethylmethacrylate (PMMA), polyvinyl acetate (PVAC), polystyrene (PS), acrylonitrile-butadiene-styrene (ABS), acrylonitrile-styrene-acrylate (ASA), ABS graft polymer, polybutylene terephthalate (PBT), polyethylene terephthalate (PET), polyvinyl chloride (PVC), polyvinylidene chloride (PVDC), polyvinylidene fluoride (PVDF), polytetrafluoroethylene (PTFE), polycarbonate (PC), polyether sulfones, polyether ketone, thermoplastic polyurethane (TPU), thermoplastic elastomers (TPE), epoxy resin (EP), silicon resin (SI), unsaturated polyester resin (UP), phenolic formaldehyde resin (PF), urea formaldehyde resin (UF), melamine resin (MF) and copolymers thereof and/or mixtures thereof. The polymer can also be a copolymer or block copolymer.

Preferably, the matrix polymer is a polyolefin, more preferably ethylene or propylene homo- or copolymers.

Conventional and suitable additives may be present in the matrix polymer.

In the laser markable composition 95-99.9 wt. % of a matrix polymer based on the total weight of the laser markable composition, can be present, preferably, 96-99 wt. %, more preferably 97-98 wt. %.

In the laser markable composition 0.1-5 wt. % of the laser marking additive, based on the total weight of the laser markable composition, can be present, preferably, 0.3-4 wt. %, more preferably 0.5-3 wt. %.

The amount of Bi-compound in the laser markable composition preferably ranges between 0.01 wt. % to 5 wt. %, more preferably between 0.02 wt. % to 3 wt. %, or between 0.3 and 1 wt. %.

Use

The invention is further directed to the use of a laser markable composition for the preparation of articles that can be marked by treating the article with laser light.

Article

The invention is further directed to an article or part of an article comprising a laser markable composition. The laser markable compositions according to the present invention can, for example, be used in any sector where conventional printing processes have hitherto been used to inscribe or mark matrix polymers. Almost any plastic article or part of an article can be obtained in a laser markable or laser writable form. Any kind of article made of a matrix polymer can be provided with functional data, barcodes, logos, graphics, pictures and identification codes. Furthermore, they can find application in the

- medical equipment such as tubes, containers for tissue samples or fluids, syringes, pots, covers, catheters,
- automotive business such as fluid containers, cabling, components,
- telecom and E&E fields such as GSM fronts, keyboards, micro circuit breakers,
- security and identification applications such as credit cards, identification cards, animal identification tags, labels, security straps,
- advertising applications such as logos, decoration on corks, golf balls, promotional articles, —packaging such as mono- and multilayer films, bottles, caps and closures including but not limited to screw caps for bottles, tamper proof caps and synthetic corks.

For example, articles made from the laser markable composition of the invention may be used in the electrical industry, electronic industry or motor vehicle industry. With the aid of laser light, it is possible to produce identification markings or inscription markings even at locations to which it is difficult to gain access, for example, on cables, lines, decorative strips, or functional parts in the heating, ventilation or cooling sector, or on switches, plugs, levers or handles which consist of the plastics of the invention. It is also possible for the polymer system of the invention to be used for packaging in the food and drinks sector, or in the toy sector. The markings on the packaging are wipe- and scratch-resistant, resistant to downstream sterilization processes, and can be applied by the marking process in a manner which is hygienically clean. Complete label motifs can be applied durably to the packaging for a reusable system. Another important application sector for laser inscription is that of the marking of plastics to produce individual identification marking for animals, known as cattle tags or ear tags. The information specifically associated with the animal is stored via a barcode system. It can be called up again when required with the aid of a scanner. The inscription must be highly durable since some tags remain on the animals for a number of years.

The invention further relates to a process for making a laser markable masterbatch comprising the steps of Providing $Bi_2O_3$ and an alcohol (preferably polyol) in powder form Providing a Polymer Extruding the polymer while adding the $Bi_2O_3$ and polyol to obtain a laser markable composition.

In this process $Bi_2O_3$ can be present as such or as a $Bi_2O_3$ masterbatch. Also the polyol can be added as pure compound or as a polyol masterbatch.

Use can be made of the masterbatch for preparing the laser markable composition.

The laser markable composition can be prepared in different ways.

The polymer and solid $Bi_2O_3$ with solid alcohol can be directly added to an extruder to make the laser markable composition.

Alternatively, a liquid masterbatch can be prepared by mixing a liquid (like for example a coloring masterbatch) with the $Bi_2O_3$ and polyol, which mixture can be added to a polymer in an extrusion step.

In yet another embodiment, the masterbatch containing $Bi_2O_3$ with a polyol can be added to a polymer in an extrusion step.

Lasermarking

The invention is further directed to the lasermarking of an article comprising the laser markable composition as described above, wherein parts of the laser markable composition are treated with light from a laser.

The laser marking additive is capable of absorbing laser light of a certain wavelength. In practice this wavelength lies between 157 nm and 10600 nm, the customary wavelength range of lasers. If lasers with larger or smaller wavelengths become available, other absorbers may also be considered for application in the additive according to the invention. Examples of such lasers working in the said area are $CO_2$ lasers (10.6 micrometer), Nd:YAG lasers, vanadate (1064, 532, 355, 266 nm), and excimer lasers of the following wavelengths: $F_2$ (157 nm), ArF (193 nm), KrCl (222 nm), KrF (248 nm), XeCl (308 nm) and XeF (351 nm), FAYb fiber lasers, diode lasers and diode array lasers. Preferably Nd:YAG, vanadate or fiber (1064 or 532 nm) lasers and $CO_2$ lasers are used since these types work in a wavelength range which is very suitable for the induction of thermal processes that are applied for marking purposes.

The energy densities of the lasers used are generally within the range from 0.3 $mJ/cm^2$ to 50 $J/cm^2$, preferably from 0.3 $mJ/cm^2$ to 10 $J/cm^2$.

When pulsed lasers are used, the pulse frequency is generally within the range from 1 to 150 kHz. Corresponding lasers which can be used in the process of the invention are commercially available. The inscription with the laser is preferably carried out by introducing the article into the ray path of a $CO_2$ laser (10.6 μm) or a pulsed laser, preferably of an Nd, YAG, vanadat or fiber laser.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

EXAMPLES

Materials:
Bismuth Compound
Bismuth oxide ($Bi_2O_3$)—Varistor grade
Polyol
P1: Dipentaerythritol of Sigma Aldrich
P2: Pentaerythritol of Sigma Aldrich
P3: 1,1,1-tris(hydroxymethyl)ethane of Sigma Aldrich
P4: PEG: Pluriol® E600 NF of BASF
Carrier Material
EMA: Elvaloy® AC 12024S of DuPont
Matrix Polymers
MP1: Queo® 0203 of Borealis
MP2: TPU 795 of BASF
MP3: Plurell GA 7760 Borealis (MDPE)
Production Process:

$Bi_2O_3$ and EMA have been added to an extruder to prepare a blend. The Bi-EMA blend has been added together with a polyol and matrix polymer to an extruder and extruded at a temperature of 160° C. After extrusion, a testpiece has been prepared (at 220° C.) that has been used for laser writing. Laser writing has been performed with a Nd:YAG laser (1064 nm), with a frequency of 28 kHz and a velocity of 2190 mm/sec The distance between the lines (hatch) was 0.076 mm.

Color measurement. The L value of the color after laser writing has been determined in the La/b color space, with the aid of a Konica Minolta spectrometer CM-3600A, against a black and white background. L values are indicative for the amount of color development after laser marking: a high L value indicates a rather weak reaction to laser light, a low value indicates a dark reaction and more response to the laser.

Lasermarking Results:

Lasermarking result judged by visual inspection of the samples.

--=very poor lasermarking, contrast very low
    -=poor lasermarking, contrast low
    +=lasermarking possible, contrast low
    ++=lasermarking possible, contrast reasonable
    +++=lasermarking good, contrast reasonable
    ++++=lasermarking good, contrast good
    +++++=lasermarking excellent dark, contrast excellent Stability results: (when exposed to ambient light at room temperature)

----=very fast grey/black coloring
    --=fast grey/black coloring
    ++=almost no grey coloring
    +++=stable color, after months no color change Test Results:

TABLE 1

| Experiment | MP1 (wt. %) | Bi2O3 (wt. %) | EMA (wt. %) | P1 (wt. %) | P2 (wt. %) | P3 (wt. %) | P4 (wt. %) | P5 (wt. %) | P6 (wt. %) | Laser-marking L* | Marking | Light Stability 20° C. |
|---|---|---|---|---|---|---|---|---|---|---|---|---|
| A (ref) | 99.7 | 0.18 | 0.12 | | | | | | | 67.1 | ++ | +++ |
| B (ref) | 99.1 | 0.54 | 0.36 | | | | | | | 63 | +++ | +++ |
| 1 | 99.7 | 0.2 | 0 | 0.1 | | | | | | 50.1 | ++++ | +++ |
| 2 | 99.4 | 0.2 | 0 | 0.1 | | | 0.3 | | | 47.3 | +++++ | ---- |
| 3 | 99.01 | 0.54 | 0.36 | | | 0.09 | | | | 58 | ++++ | +++ |
| 4 | 99.01 | 0.54 | 0.36 | 0.09 | | | | | | 48 | +++++ | -- |
| 5 | 99.01 | 0.54 | 0.36 | | 0.09 | | | | | 44 | +++++ | ---- |
| 6 | 99.01 | 0.54 | 0.36 | | | | | 0.09 | | <50 | +++++ | ---- |
| 7 | 99.01 | 0.54 | 0.36 | | | | | | 0.09 | <60 | ++++ | ++ |

P1: dipentaerythritol Mp = 215-218° C.
P2: pentaerythritol Mp = 253-258° C.
P3: 1,1,1-tris(hydroxymethyl)ethane, (2-Hydroxymethyl-2-methyl-1,3-propanediol) Mp 190-200° C.
P4: PEG 600 (liquid at room temperature)
P5: 1,2 propylene glycol (liquid at room temperature)
P6: di(trimethylolpropane) Mp 108-111° C.

It can be seen from table 1 that a $Bi_2O_3$/EMA mixture shows some laser marking activity. This activity is however increased by polyols P1-P4, or combinations of polyols (example 2). The stability against discoloration (from a white resin to a grey or black resin over time, due to exposure of the sample to ambient light at room temperature) of the liquid alcohols (PEG, MEG) is insufficient.

TABLE 2

| Experiment | MP2 wt. % | MP3 wt. % | $Bi_2O_3$ wt. % | P1 wt. % | Titaan dioxide wt. % | Eartag yellow wt. % | Laser marking result |
|---|---|---|---|---|---|---|---|
| C (ref) | 100.00 | | | | | | – |
| 6 | 98.70 | | 0.20 | 0.10 | | 1.00 | +++++ |
| D (ref) | | 100.00 | | | | | – |
| 7 | | 98.90 | 0.20 | 0.10 | 0.80 | | +++++ |

Table 2 shows that other matrix polymers like MP2 and MP3 also can be activated by the new bismuth laser writing additive, while the polymers without additive do not show any response to a laser.

What is claimed is:

1. A laser marking additive comprising: a bismuth compound and an alcohol, wherein $Bi_2O_3$ is used as the bismuth compound and wherein the alcohol has a melting temperature of at least 40° C., and wherein the weight ratio between $Bi_2O_3$ and the alcohol having a melting temperature of at least 40° C. is between 3:1 and 1.5:1.

2. The laser marking additive according to claim 1, wherein the alcohol has a melting temperature (Tm) of at least 100° C.

3. The laser markable composition according to claim 2, wherein the alcohol has a melting temperature (Tm) of at least 200° C.

4. The laser markable composition according to claim 3, wherein the alcohol has a melting temperature (Tm) of at least 240° C.

5. The laser marking additive according to claim 1, wherein the melting temperature of the alcohol is between 0 and 50° C. above a processing temperature of a matrix polymer in a step of making a laser markable composition.

6. The laser marking additive according to claim 1, wherein the alcohol is a polyol is chosen from the group consisting of pentaerythritol, dipentaerythritol, 1,1,1-tris (hydroxymethyl) ethane (or 2-Hydroxymethyl-2-methyl-1, 3-propanediol), 2,2,2',2',tetrakis(hydroxymethyl)-3,3'oxy-dipropan-1-ol, and di(trimethylolpropane).

7. The laser marking additive according to claim 1, wherein further a carrier material is present.

8. The laser marking additive according to claim 7, wherein the carrier material is an oil, a fatty acid or a polymeric material.

9. The laser marking additive according to claim 8, wherein the polymeric material is selected from polyethylenemethylacrylate (EMA) or polyethylenevinylacetate (EVA).

10. A masterbatch, comprising: the laser marking additive according to claim 1, wherein the amount of laser marking additive ranges between 0.01 and 70 wt. % and wherein the weight ratio between the $Bi_2O_3$ and alcohol ranges between 3:1 and 0.5:1.

11. A laser markable composition, comprising: 95-99.9 wt. % of a matrix polymer and 0.1-5 wt. % of the laser marking additive according to claim 1, based on the total weight of the laser markable composition.

12. The laser markable composition according to claim 11, wherein the amount of the $Bi_2O_3$ in the laser markable composition ranges between 0.01 wt. % to 5 wt. %.

13. The laser markable composition according to claim 12, wherein the amount of the $Bi_2O_3$ in the laser markable composition ranges between 0.05 wt. % to 3 wt. %.

14. The laser markable composition according to claim 13, wherein the amount of the $Bi_2O_3$ in the laser markable composition ranges between 0.1 and 1 wt. %.

15. An article or part of an article, comprising: the laser markable composition according to claim 11.

16. Use of a laser markable composition according to claim 11 for the preparation of articles that can be marked by treating the article with laser light.

17. Use of the laser marking additive according to claim 1, for the preparation a masterbatch or laser markable composition for the preparation of articles that can be marked by treating the article with laser light.

18. The laser marking additive according to claim 1, wherein the alcohol has a melting temperature (Tm) of at least 80° C.

19. A masterbatch, comprising: a laser marking additive comprising a bismuth compound and an alcohol, wherein $Bi_2O_3$ is used as the bismuth compound and wherein the alcohol has a melting temperature of at least 40° C., wherein the amount of laser marking additive ranges between 0.01 and 70 wt. % and wherein the weight ratio between the $Bi_2O_3$ and alcohol ranges between 3:1 and 0.5:1.

20. A laser markable composition, comprising: 95-99.9 wt. % of a matrix polymer and 0.1-5 wt. % of a laser marking additive comprising a bismuth compound and an alcohol, wherein $Bi_2O_3$ is used as the bismuth compound and wherein the alcohol has a melting temperature of at least 40° C., based on the total weight of the laser markable composition.

* * * * *